J. C. Cooke.
Button Mach.
No. 1446.
Reissued Apr. 7. 1863.
Fig. 4.
Fig. 1
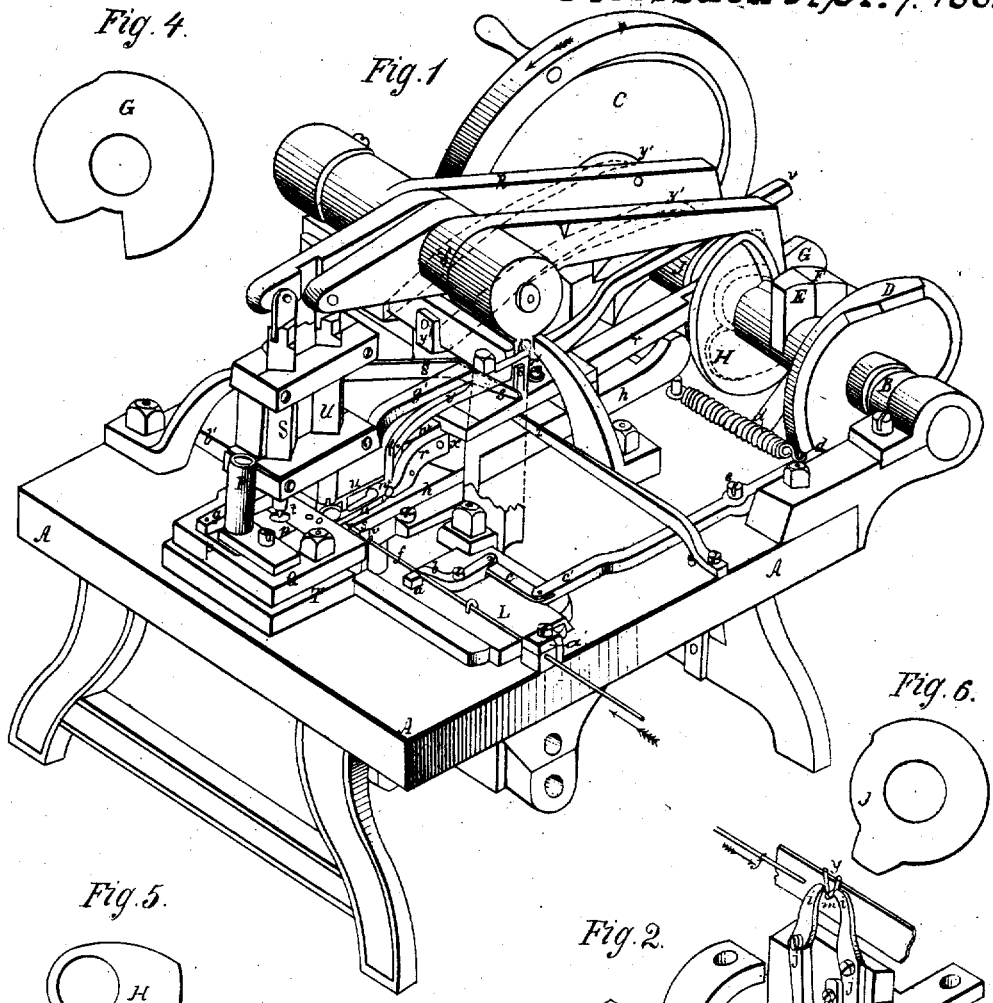
Fig. 6.
Fig. 5.
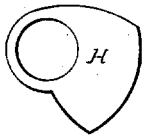
Fig. 2.
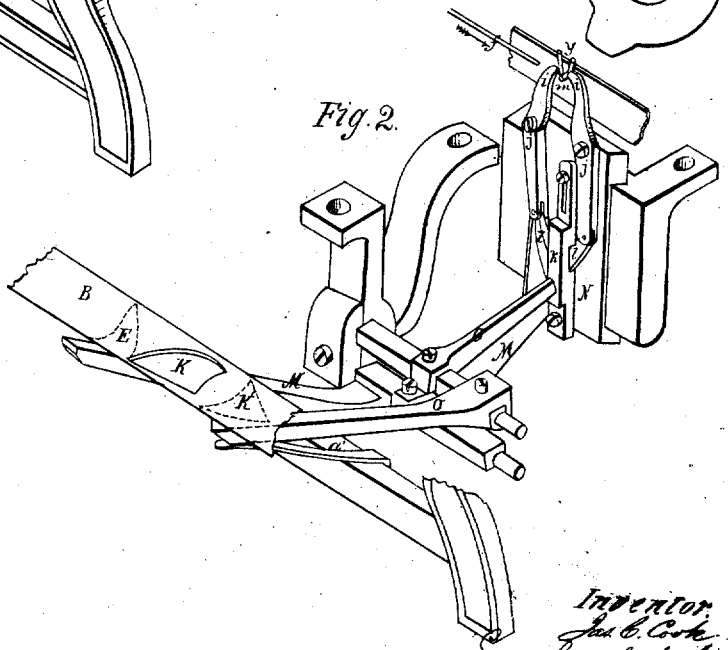
Fig. 3.
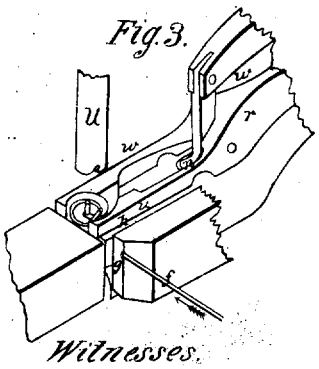
Witnesses.
George H. Pendleton
E. A. Pendleton
Inventor
Jas. C. Cooke
Luther C. White
Prest. Cty Manuf Co.

UNITED STATES PATENT OFFICE.

THE CITY MANUFACTURING COMPANY, OF WATERBURY, CONN., ASSIGNEES, BY MESNE ASSIGNMENTS, OF JAMES C. COOKE, OF SAME PLACE.

IMPROVEMENT IN MACHINES FOR FORMING BUTTON-BACKS AND CONNECTING THE EYES THERETO.

Specification forming part of Letters Patent No. 9,146, dated July 27, 1852; Reissue No. 1,446, dated April 7, 1863.

*To all whom it may concern:*

Be it known that JAMES C. COOKE, of the town of Waterbury, county of New Haven, and State of Connecticut, was the inventor of certain new and useful Improvements in Machinery for Making Button-Backs and Connecting the Eyes Therewith; and I do hereby declare that the following is a full, clear, and exact description of the construction and operation of the same, reference being had to the accompanying drawings and the letters of reference thereon, and which make a part of this specification.

Figure 1 is a perspective view of the machine, showing the levers, dies, slides, cams, springs, &c. Fig. 2 is a perspective view of that part of the machine which is under the bed-plate, showing how the eye is bent to its proper shape by the clamps. Fig. 3 is a perspective view of the die which sets or rivets down the eye in the button-back, and the parts connected with it. Fig. 4 is a plan view of the cam G, which acts upon the bar *h*, which cuts off the wire, and also forms a part of the bed on which the back rests while the eye is being riveted or set down. Fig. 5 is a plan view of the cam H, which acts upon the bar *r*, that with its fingers picks up the back and places it on the eye, and which is located between the cams G and J on the main shaft, represented in Fig. 1 in dotted lines. Fig. 6 is a plan view of the cam J, which acts on the bar *r* to depress the fingers to set the back on the eye after both are formed.

The improvement or invention consists in so constructing and arranging the several parts of the machine that by pouring the blanks for the backs into a hopper they will pass down through an upright hollow cylinder to a sliding plate, which carries each blank separately to the die, which punches them to receive the eye and gives it the appropriate shape, and so that the wire for the eye may be fed by the jaws of a jointed lever and sliding plate to the place for forming the eye, be cut off the proper length, and by suitable fingers or clamps, &c., be bent around a pin to the proper shape to be inserted in the back, and that the back, after being formed, will be taken by another pair of fingers and placed on the eye, formed as described, when a die or punch worked by a lever and cam, or in any desired manner, will set or rivet down the eye inside of the back, the eye being held by the mechanism forming it, while the back is placed on it and the two fastened or riveted together, and then thrown out into a proper receptacle, ready for use.

The frame A A A is of cast-iron or any other suitable material, of a convenient size and shape for use. The main or cam shaft B is of any suitable metal, having a fly-wheel, C, and cams D, E, F, G, H, J, K, and K′ to work the several levers and bars.

The apparatus for feeding the wire for the eye of the button is a flat sliding plate, L, Fig. 1, on which is a fixed or stationary jaw, *a*, and a movable one, *b*, which is moved against the stationary jaw *a* by means of the jointed lever *c c′*. This lever is worked by the cam D on the main shaft coming in contact with the extreme end of the lever, (as at *d*, Fig. 1,) and forcing it out toward the edge of the frame, which motion, by means of the fulcrum-screw *e*, presses the movable jaw *b* toward the fixed jaw *a*, so as to bind the wire *f*, when, by the continued action of the cam D on the levers *c c′*, the sliding plate L will be carried forward so as to force a length of wire sufficient for one eye through the hole in the block of the cutting-die, as seen at *g*, Figs. 1 and 3. When the wire has been thus passed through the hole *g*, the cam G forces forward the bar *h*, (the corner of which forms the cutting-edge of the die,) which cuts off the wire and passes up to form a part of the bed, on which the back rests while the eye is being riveted in, and also at the same time to steady the eye, after which it is thrown back by the spring *z*, Fig. 1. The sliding plate L is thrown back by the spiral spring *d* acting on the end of the lever *c c′*, Fig. 1, while the wire is steadied by the block or stud *d′* by the pressure of the screw passing through it. The spring B′, Fig. 1, is designed to steady the wire while being cut; but it is not material. When the wire has thus been passed in and cut off, the jointed fingers or clamps *i i*, Fig. 2, are forced upward by the action of the cam E on the main shaft on the compound lever M M, which works the sliding plate N, to which the jointed clamps *i i* are attached by the fulcrum-screws *j j*, so as to bend the wire up and around the pin *m*, as seen in Fig. 2. At this time a cam like K, Fig. 2, (not seen, but indicated by dotted lines at K′, Fig. 2,) acts on the compound lever O O and raises the slide K, Fig. 2, which, by means of the arms *l l* working on joint-pins, spreads out the legs of the clamps or fingers *i i*, so as to bring their jaws nearly together above the pin *m*, as seen in Fig. 2, so as to give the eye the proper shape, and at the same time the projection or tongue *n*, Figs. 1, 3, acted upon by the lever *v*, comes between the upper ends of the wire and bends them outward, as seen in Figs. 2 and 3, when the eye is ready to receive the back, as represented at *y*, Fig. 2.

The blanks for the backs are poured into a convenient hopper, which will deliver them into the upper end of the upright hollow cylinder P, Fig. 1. From such cylinder they pass out singly onto the stationary plate or platform Q in such a position as to rest in a semicircular space in the thin plate *p p*, which is forced out to the proper position for that purpose by the bar *g′ g′*, Fig. 1, and to which it is attached. This bar *g′* is attached to the bar *r r* at *r′*, which is worked by the cam H, (which is indicated by the dotted lines at H, Fig. 1, and is located between the cams G and J,) and is thrown back by the springs *s s*, so as to bring the blank to the forming and punching die, as seen at *t*, Fig. 1. When the blank is in this position, the cam K, Fig. 2, raises the back end of the lever R, and thereby forces down the punch S of the forming-die, which punches and forms the back by forcing it through the die or plate of the platform Q down onto the plate or bed T, in the proper shape or form to receive the eye. The cam H, Figs. 1 and 5, acting on the end of the bar *r r*, Figs. 1 and 3, forces forward the fingers *u u* till they pass under the forming-punch S, where they receive the back as it is punched and formed. The spring *s s* then throws back the bar *r r*, so as to bring the formed back held in the fingers *u u* directly over the eye, (bent as before described,) where the projection on the cam J, Figs. 1 and 6, by raising the back end of the lever *v v*, forces down the fingers, so as to place the back on the eye, as seen in Figs. 1 and 3. The cam F, which is of a shape like K, then raises the back end of the lever V, which forces down the set-punch U, so as to set or rivet the eye into the back, and as the cam J releases the lever *v v* the spring *w*, Figs. 1 and 3, raises the fingers *u u*, (which work on a joint-pin shown at *x*, Fig. 1,) when the complete button-back, with the eye inserted and riveted, falls into a proper receptacle.

It will be seen that the eye, after it has been shaped by means of the fingers or clamps *i i* and the pin *m*, is held by the same mechanism which formed it until and while the button-back is placed over the eye and the latter set or riveted to the back by means of the punch U, and is not released from such mechanism until the eye and back are firmly connected together.

Heretofore the eye has been formed by itself by suitable mechanism, and when properly shaped dropped, and then another one formed, and so on continuously. The eyes, when thus formed, had to be picked up and placed in a vise, or in some suitable place to hold them, and the back was then placed upon them, and the two fastened together. These separate operations consumed time, and therefore increased materially the cost of the construction of the complete back; but by causing the same mechanism that forms the eye to continue to hold it while the back is placed upon it and the eye fastened, the whole operation of forming the complete back is performed in a less time and at a reduced cost. This feature of the invention—causing the parts that form and shape the eye to retain it while the back is being placed upon and fastened to it—may be used with great advantage when the backs are formed by machinery not connected with that which forms the eye, and when the backs are placed upon the eye by hand and then fastened together. All the levers, bars, &c., which are moved in one direction by the cams, are thrown back to their original positions by suitable springs, as seen at *a d s s w z y′*, which may be made of the kind and form, and located as convenience may require.

There may be a die or dies fitted at the top of the upright cylinder P, so as to cut the blanks from the sheet metal at the same time and operated by the same power by which the other work is done, if thought best at any time.

The cylinder P, dies, &c., may be replaced by others of a larger and smaller size, so that button-backs of any size may be made in the same machine, and their shape may be varied at pleasure if the metal is of the proper thickness, &c., for the kind desired.

The machine may be worked by any power applied to the main shaft by gear-wheels, pulley and band, crank, or otherwise, as may be found most convenient.

What is claimed as new, and is desired to be secured by Letters Patent, is—

1. The jointed clamps *i i*, Fig. 2, and the tongue *n*, Figs. 1, 3, to form the eye, when combined with the slide L, with its stationary and movable jaw *a* and *b*, the movable jaw and slide being worked by a jointed lever, *c c′*, to feed the wire, the whole constructed and operated substantially as described.

2. The die for punching and forming the button-back, composed of the punch S, and bed Q, when combined with the slide *p p* and feeding-cylinder P, when constructed and operating substantially as described.

3. The jointed fingers *u u*, for receiving the button-back when formed and punched, and conveying it to and placing it on the eye, when combined with the setting and riveting punch U, when constructed, arranged, combined, and operated substantially as described.

4. Holding the eye of the button in the mechanism that forms the eye until and while the back is placed upon and fastened to it.

LUTHER C. WHITE,

*Pres. City Manufacturing Co., Assignee of James C. Cooke.*

Witnesses:

GEORGE H. PENDLETON,
E. A. PENDLETON.